Figure 1:
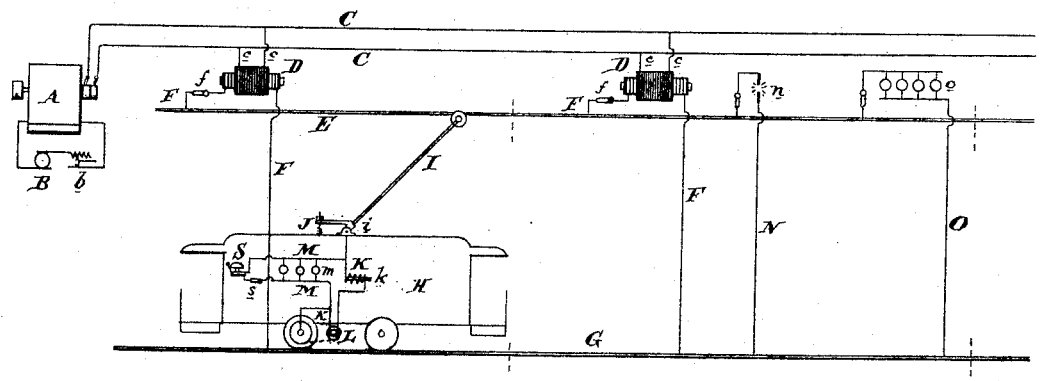

No. 620,654. Patented Mar. 7, 1899.
R. M. HUNTER.
ELECTRIC RAILWAY.
(Application filed Oct. 21, 1889.)

(No Model.)

Attest

Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC RAILWAY.

SPECIFICATION forming part of Letters Patent No. 620,654, dated March 7, 1899.

Application filed October 21, 1889. Serial No. 327,632. (No model.)

*To all whom it may concern:*

Be it known that I, RUDOLPH M. HUNTER, of the city and county of Philadelphia, in the State of Pennsylvania, have invented an Improvement in Electric Railways, of which the following is a specification.

My invention has reference to electric railways; and it consists of certain improvements, all of which are fully set forth in the following specification and shown in the accompanying drawings, which form part thereof.

My invention set out in this specification (Case No. 117) comprehends the employment of alternating current or one of alternately increasing and decreasing potential and secondary generators or induction apparatus in connection with a railway and electrically-propelled vehicles therefor.

In carrying out my invention I provide the railway with a working conductor or conductors extending along its length, which may be arranged in any suitable manner; an electrically-propelled vehicle provided with, preferably, an alternating-current motor and receiving current from the working conductors; a source of alternating current; line or supply conductors extending along the railway, and induction-coils or secondary generators having their fine-wire coils in circuit with the supply or line conductors and their coarse-wire coils in circuit with the working conductors. If desired, one of each pair of the conductors may be the earth, and in the case of the working conductors one may be the rails. The secondary generators or induction-coils may be arranged along the railway or otherwise at intervals, so as to distribute the current uniformly to the conductors. The motors on the car or electrically-propelled vehicle are in a closed circuit independent of the supply-circuits and alternating-current generator.

Broadly considered, my invention relates to means for the operation of electrically-propelled vehicles by the employment of induced currents of alternating polarity or of alternating increasing and decreasing tension.

If desired, the alternating-current generator may be wound to produce currents of low potential, which by conversion by induction-coils may be changed to currents of high tension and transmitted over the line and again converted into low-tension currents for operating the motors and electric lights. The lighting apparatus may be connected in parallel with the motors on the railway, and such lights may be used for lighting the railway and also for lighting the cars. The vehicles or cars may also be provided with an electric signal in multiple with the motor and be controlled by a switch. The translating devices of the railway are in a circuit independent of the supply or line circuit and receive their energy through the mediation of the induction-coils or secondary generators from the line or supply conductors.

Figure 2:
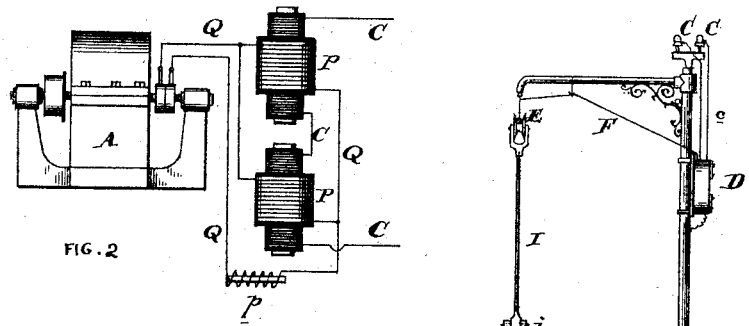
Figure 3:
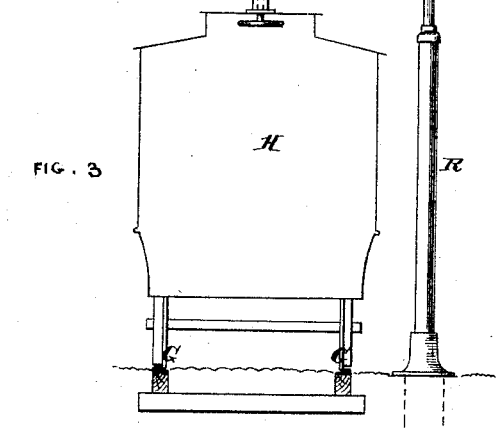

In the drawings, Figure 1 is a diagram illustrating the principles embodied in my invention. Fig. 2 is a general view showing a modified form of the generating apparatus, and Fig. 3 is a cross-section of an electric railway embodying my improvements.

A is the alternating generator of the ordinary type. B is its exciting-dynamo, and $b$ is the regulator. The current from the generator A passes down the line or supply conductors C C and through the fine wire of the secondary generators or induction-coils D, which fine wire is in shunt-circuits $c\ c$. It is preferable that the various secondary generators shall be in multiple or parallel with each other, as shown, though this is not absolutely necessary. E and G are the two working conductors, and of these E represents a suspended conductor and G the rails. This construction is very clearly shown in Fig. 3. The coarse wire of the induction-coils or secondary generators D are included in circuits F, connecting with the conductors E and G and are preferably arranged in parallel. The circuits F may be provided with switches $f$, if desired. While the conductors F and G are shown as continuous, it is evident that either or both may be made in sections, the dotted cross-lines indicating where the insulating divisions would occur. It is evident that each section might have any number of induction-coils desired. If the rails G are employed as conductors, it would not be necessary to divide them into sections, as they would ordinarily be grounded and the earth act in conjunction with the rails as the common return.

H are the electrically-propelled vehicles or cars and may have motors L of any suitable construction, preferably adapted to operate with alternating current and suitably connected to drive the axle.

I is an upwardly-extending contact-arm making a traveling contact with the conductor E and supplying current to the motor-circuit K on the car, which circuit includes the regulator $k$ and motor L and delivers the current to the return conductor-rail G. The collector-arm I is hinged to the vehicle at $i$ and is pressed upward against the under side of the conductor E by a spring J. Any form of collector may be used, as may also any system of working conductors. The conductors may be arranged in a conduit, on the surface, or suspended, or any combination of these.

The car is provided with a branch circuit M in parallel with the motor, which may contain electric lamps $m$ to light the car and an electric bell S for signal purposes, which latter may be controlled by a switch $s$.

N is a branch circuit connecting the conductors E and G and may contain an arc-light $n$ for lighting the railway. O is a similar circuit, including incandescent lamps $o$ for similar purposes or at a station.

In Fig. 3 is shown a cross-section of a railway such as set out in Fig. 1, in which the supply or line conductors C C, the secondary generators or induction-coils D, and the working conductor E are suspended or supported by the posts R. Any number of cars may be used upon the same railway, and each is independently regulated, while maintaining the current in the circuit $c\ c$ the same.

Referring to Fig. 2, we have the generating apparatus of Fig. 1 with the employment of induction-coils P P for converting a low-tension current from the machine A into high-tension currents for transmission down the line C C. One or more of said induction-coils P may be used in connection with the generator A, and the entire apparatus (shown in Fig. 2) may be considered as generating apparatus for alternating currents of high tension. It is quite evident that the coils P may be incorporated into the structure of the machine A if so desired. As shown, the low-tension current from the machine A passes by conductor Q through the coarse wire of the coils P, preferably coupling them in parallel. The secondary or fine-wire coils of these induction-coils P are preferably coupled in series with the line C, as shown. A regulator $q$ may be used in the circuit Q, if desired. The object of this arrangement in Fig. 2 is to enable the generating-machine A to be wound with coarse wire, and thereby reduce the danger to destruction and loss in case of accidental destruction of the insulation. This system is excellently adapted for transmission over very long distances and enables any desired potential to be used without danger either to the primary generator or to the motors on the cars.

Having now described my invention, what I claim as new, and desire to secure by Letters Patent, is—

1. The herein-described method of operating an electric railway which consists in supplying high-tension currents of alternately increasing and decreasing potential to a circuit extending along the railway, converting by induction the said high-tension currents into alternating currents of lower potential at intervals along the railway, delivering said low-tension currents to a single common continuous conductor, and delivering said low-tension currents from said conductor to independent electric motors upon a series of independent cars so that said motors are in parallel, and independently controlling the current flowing through the motors.

2. The method of operating an electric railway which consists in supplying to a conductor extending along the railway currents of alternately increasing and decreasing potential, converting said currents by induction into currents of lower potential and delivering said induced currents to the motors on the several cars, and controlling the induced current flowing through the motors of the several cars independently of each other and independent of the current supplied to the conductor extending along the railway.

3. The method of operating electrically-propelled cars on a railway which consists in supplying currents of alternating polarity to a primary circuit, and by induction apparatus converting said currents into currents of alternating polarity but of lower potential in a secondary circuit including the electric motors, and varying the current in the secondary or motor circuit by a joint variation of the speeds of the various electric motors under hand regulation while maintaining the current in the primary circuit.

4. The method of operating an electric railway consisting in supplying to a conductor extending along the railway currents of electricity of alternately increasing and decreasing potential and by induction generating corresponding currents but of lower potential, supplying such currents to motors on a number of separately and independently propelled electric vehicles while maintaining the motors in parallel, and independently varying the induced current passing through the motors to independently control the speed of the several vehicles.

5. The combination of a primary generator of alternating currents of low potential, and induction apparatus adjacent to the primary generator for converting the low-potential currents into high-potential currents and delivering them to a line-circuit, with a line conductor arranged along the line of travel of a vehicle, a traveling vehicle having an electric motor to propel it, a circuit traveling with the vehicle and including the motor, and induction apparatus through which the currents in the line conductor pass and induce currents of lower potential which are supplied to the circuit traveling with the vehicle.

6. The combination of a railway the rails of which form part of the electric circuit, a series of poles or supports arranged along the railway, a suspended working conductor supported above the railway by the poles or supports, a series of converters or induction-generators supported out of reach on the poles or supports and having their coarse wire connected respectively to the suspended conductor and rails, a line-conductor circuit connecting with the fine wire of the converters, and a generator of electric current of alternately increasing and decreasing potential for supplying current to said line conductor.

7. In an electric railway, the combination of an alternating generator, a vehicle or vehicles moving along a track, a motor or motors mounted upon said vehicle or vehicles, an inductional transformer or transformers interposed between the generators and the motors for changing the tension of the current from the generator, and means for regulating the supply of energy to the motors.

8. In an electric railway, the combination of an alternating generator, a movable vehicle or vehicles upon a line of railway, a motor or motors mounted upon said vehicle or vehicles, inductional devices for changing the tension of a current interposed between the generator and the motors, and connections composed wholly or in part of the rails for carrying the current from the tension-changing devices to the motors.

9. In an electric railway, a source of alternating currents, feeder-conductors extending therefrom, a vehicle having an electromotor mounted thereon, through which an alternating current is transmitted, a transformer interposed between said feeder-conductors and said electromotor and in operative relation therewith, and means for modifying the current transmitted through the electromotor.

10. In an electric railway, a source of alternating currents, feeder-conductors extending therefrom, a vehicle having an electromotor mounted thereon through which an alternating current is transmitted, a transformer interposed between said feeder-conductors and said electromotor and in operative relation therewith, and means carried by the vehicle for varying the current transmitted through the motor.

11. In an electric railway, the combination with a generator of alternating currents, a vehicle having a propelling-electromotor mounted thereon, through which an alternating current is transmitted, a current-transformer having a primary and a secondary coil, said primary coil in operative relation with said generator, and said secondary coil in operative relation with said electromotor, and means for modifying the current transmitted through the motor.

12. The combination of a railway in which the rails act as a conductor, a suspended working conductor, a traveling car having an electric motor, a current-collecting device carried by or moving with the car and making a traveling connection with the suspended working conductor, line conductors extending along the railway and conveying a current of alternately increasing and decreasing potential, and a suspended secondary generator having its fine wire in circuit with the line conductors and its coarse wire in circuit with the suspended working conductor and rails.

13. The combination of a railway in which the rails act as a conductor, a suspended working conductor, a traveling car having an electric motor, a current-collecting device carried by or moving with the car and making a traveling connection with the suspended working conductor, line conductors extending along the railway and conveying a current of alternately increasing and decreasing potential, and a secondary generator having its fine wire in circuit with the line conductors and its coarse wire in circuit with the suspended working conductor and rails, and a branch circuit including electric lamps for lighting the railway and having its terminals connected respectively in circuit with the coarse wire of the secondary generator and in parallel with the motor on the car.

14. The herein-described method of operating an electric railway which consists in generating low-tension currents of alternately increasing and decreasing potential, producing by induction similar currents of a higher potential, transmitting said high-potential currents to various points adjacent to the railway, producing by induction at said points currents of lower potential, delivering said lower-potential currents to a series of independently-movable cars and maintaining the electrical connection with said cars of the low-potential currents so delivered to the cars, and independently varying the current in the motors of the several cars to cause the said cars to run at different speeds.

15. The herein-described method of operating an electric railway which consists in generating low-tension currents of alternately increasing and decreasing potential, producing by induction similar currents of higher potential, transmitting said high-potential currents to various points adjacent to the railway, producing by induction at said points currents of lower potential, combining said several lower-potential induced currents, delivering said lower-potential currents to a series of independently-movable cars and maintaining the electrical connection with said cars in parallel, operating an electric motor on each car by the low-potential currents so delivered to the cars so that the motors are operated in parallel, and independently varying the current in the motors of the several cars to cause the said cars to run at different speeds.

16. The herein-described method of operating an electric railway which consists in generating low-tension currents of alternately increasing and decreasing potential, producing by induction similar currents of higher potential, transmitting said higher-potential currents to distant places arranged adjacent to the railway, converting said currents by induction into currents of lower potential, and supplying the low-potential induced currents to an electrically-operated car moving along the railway so that the currents from the several induction-coils are each caused to operate the same electric motor during the travel of the vehicle.

17. The method of operating an electric railway which consists in generating low-tension currents of alternately increasing and decreasing potential, transmitting said currents into high-potential currents and delivering said high-tension currents to a distant place adjacent to the railway, converting by induction the said high-tension currents at said distant place into low-tension currents, supplying said low-tension currents to an electric motor upon a traveling car adapted to move relatively to said place of transmission, and varying the current operating the electric motor upon the vehicle to vary its speed independently of its position upon the railway.

In testimony of which invention I have hereunto set my hand.

RUDOLPH M. HUNTER.

Witnesses:
ERNEST HOWARD HUNTER,
S. T. YERKES.